United States Patent [19]

Becerra et al.

[11] Patent Number: 5,675,365
[45] Date of Patent: Oct. 7, 1997

[54] EJECTOR ACTIVATION SCHEDULING SYSTEM FOR AN INK-JET PRINTHEAD

[75] Inventors: Juan J. Becerra; Christopher R. Morton, both of Webster; Thomas A. Tellier, Wolcott; David A. Mantell, Rochester; Eduardo M. Freire, Webster, all of N.Y.

[73] Assignee: Xerox Corporation, Stamford, Conn.

[21] Appl. No.: 527,393

[22] Filed: Sep. 13, 1995

[51] Int. Cl.[6] ............................................. B41J 29/38
[52] U.S. Cl. ............................................. 347/9; 347/14
[58] Field of Search ........................... 347/9, 14, 240, 347/5

[56] References Cited

U.S. PATENT DOCUMENTS

| | | | |
|---|---|---|---|
| 3,988,742 | 10/1976 | Meier et al. | 347/240 |
| 4,222,060 | 9/1980 | Sato et al. | 347/9 |
| 4,746,935 | 5/1988 | Allen | 346/140 R |
| 5,045,951 | 9/1991 | Kimura et al. | 358/445 |
| 5,083,137 | 1/1992 | Badyal et al. | 347/14 |
| 5,144,336 | 9/1992 | Yeung | 346/76 PH |
| 5,172,139 | 12/1992 | Sekiya et al. | 346/140 R |
| 5,396,078 | 3/1995 | Klaus et al. | 250/551 |

FOREIGN PATENT DOCUMENTS

0623473A2  4/1994  European Pat. Off.

Primary Examiner—Benjamin R. Fuller
Assistant Examiner—Thinh Nguyen
Attorney, Agent, or Firm—R. Hutter

[57] ABSTRACT

An ink-jet printhead accepts a series of digital addresses as image data. Each digital address causes an individual ejector in the printhead having the particular address to be activated. The frequency of operation of the printhead can be directly related to the frequency at which addresses are submitted to the printhead. A scheduler polls image data for spot placements which require simultaneous activation of a plurality of ejectors in a set of interdependent ejectors, and then reschedules the activation of ejectors to avoid conflicts.

18 Claims, 8 Drawing Sheets

|  | ONE CYCLE | | | | | | | | | |
|---|---|---|---|---|---|---|---|---|---|---|
| TIME SLOT | A | B | C | D | E | F | G | H | I | J |
| DESIRED EJECTOR (IMAGE DATA) |  |  |  | 1,6 | 2,7 | 3,8 | 4,9 | 5,10 |  |  |
| OPTIMIZED SCHEDULE | 2 | 3 | 1 | 4 | 5 | 6 | 7 | 10 | 8 | 9 |
| DYNAMIC SCHEDULE | 1 | 6 | 2 | 7 | 3 | 8 | 4 | 9 | 5 | 10 |

TIME ⟶

EJECTOR ACTIVATION SCHEDULING SYSTEM FOR AN INK-JET PRINTHEAD

The present invention relates to ink-jet printing, and is particularly concerned with a system for addressing individual ejectors in an ink-jet printhead for high-precision placement of spots on a sheet.

In thermal ink jet printing, the printhead typically comprises a linear array of ink ejectors, each ejector including a channel communicating with an ink supply chamber at one end and having an opening at the opposite end, referred to as a nozzle. A thermal energy generator, usually a resistor, is located in each of the channels, a predetermined distance from the nozzles. The resistors are individually addressed with a current pulse to momentarily vaporize the ink and form a bubble which expels an ink droplet. As the bubble grows, the ink rapidly bulges from the nozzle and is momentarily contained by the surface tension of the ink as a meniscus. As the bubble begins to collapse, the ink still in the channel between the nozzle and bubble starts to move towards the collapsing bubble, causing a volumetric contraction of the ink at the nozzle and resulting in the separation of the bulging ink as a droplet. The acceleration of the ink out of the nozzle while the bubble is growing provides the momentum and velocity of the droplet in a substantially straight line direction towards a print sheet, such as a piece of paper. Because the droplet of ink is emitted only when the resistor is actuated, this type of ink-jet printing is also known as "drop-on-demand" printing. Other types of drop-on-demand ink-jet printing, such as piezoelectric or acoustic, are known as well.

In common designs of ink jet printing apparatus, the printhead is moved relative to the surface of the print sheet, either by moving the print sheet relative to a stationary printhead, or vice-versa, or both. In some types of apparatus, a relatively small printhead reciprocates across a print sheet numerous times in swaths, much like a typewriter; alternatively, a printhead which extends the full width of the print sheet may be passed once down the print sheet to give full-page images, in what is known as a "full-width array" printer. When the printhead and the print sheet are moved relative to each other, imagewise digital data is used to selectively activate the thermal energy generators in the printhead over time so that the desired image will be created on the print sheet.

Because of the fixed position of individual ejectors in an ink-jet printhead, the resolution of spots placed on the print sheet by the printhead is fixed along the dimension in which the linear array extends. For example, if the ejectors in the printhead of either type are spaced 300 to the inch, the resolution for the dimension on the print sheet perpendicular to the scan direction can be no more than 300 spots per linear inch, barring some special construction of the printhead. In the direction of travel of the printhead relative to the print sheet, the resolution of spot placement may be altered by varying the rate at which ink droplets are ejected from the printhead as the printhead moves at a particular velocity. For example, in a basic case with a 300 spi printhead, the ejectors are typically operated with a frequency so that as many as 300 droplets may be ejected by each ejector as the printhead travels one inch relative to the print sheet. By doubling the frequency of ejector operation with the printhead moving at the same velocity, the resolution in the direction of travel of the printhead can be increased to 600 spi, for a two-dimensional image resolution of 300×600 spi. This one-dimensional resolution-doubling technique is featured, for example, in currently-available products from Canon, Inc. and others.

In the prior art, U.S. Pat. No. 4,746,935 discloses the problems of increasing droplet generation rates in order to provide multi-tones in an ink-jet printer.

U.S. Pat. No. 5,045,951 discloses a "video printer" which is designed to extract digital image data, suitable for operating a printing device, from an analog video signal. In order to overcome certain practical problems with analog-to-digital conversion, the apparatus is capable of manipulating the frequency and phase shift of the digital sampling of the analog signal. The apparatus includes a set of selectable frequency divided clocks having different phases.

U.S. Pat. No. 5,144,336 shows, at FIG. 5 thereof, a "pulse generator" which is connected to set of control lines, each control line adapted to control the voltage level on a row or column line addressing a set of heating elements in a two-dimensional ink-jet or thermal printhead, in order to equalize power consumption among rows and columns of resistors in the printhead. The patent also discloses the idea that heating elements can be signaled with "non-printing pulses" to maintain a desired energy consumption throughout the printhead.

U.S. Pat. No. 5,172,139 discloses an ink-jet printhead in which each ejector includes a plurality of energy generating elements for each ejector.

U.S. Pat. No. 5,396,078 discloses a carriage-type ink-jet printing apparatus in which a control system communicates with the reciprocating printhead by an infrared data link. The information exchanged between the printhead and the control system can be bidirectional.

European Patent Application EP-A2-0 623 473 discloses the concept of improving print resolution in the carriage scan direction relative to the fixed resolution provided by the printhead nozzles.

In currently commercially-available designs of thermal ink-jet printing systems, each individual ejector in a printhead is "addressed" at a predetermined frequency. Every time the ejector is addressed, the ejector receives an instruction to print or not print: typically each ejector is addressed at a far faster rate than it is actually being activated. A relatively large amount of print data must be entered onto the printhead, even to instruct an ejector not to print.

According to one aspect of the present invention, there is provided an ink-jet printing apparatus, comprising a silicon chip defining therein an energy-imparting portion of each of a plurality of ejectors, with each energy-imparting portion being selectably actuable by application of a signal thereto. A decoder is provided, with at least a portion of the decoder being formed on the silicon chip. The decoder is operatively connected to an energy-imparting portion of each of a plurality of ejectors. The decoder accepts as inputs a list of digital addresses of individual ejectors to be activated, and activates the energy-imparting portions of an ejector in response to receiving a digital address of the ejector. There may also be provided an address converter, operatively connected to the decoder adapted to output to the decoder a series of digital addresses of ejectors to be activated over time. The address converter can output addresses to the decoder at a regular frequency relating to a desired frequency of ejector activation of the printhead.

According to another aspect of the present invention, there is provided a method of operating a printhead including a linear array of ejectors. For a set of N ejectors in the printhead, means are provided for selectably activating each of the ejectors in the set within a cycle of predetermined duration, with the cycle being divided into N time slots. The printhead is moved in a process direction at a process velocity relative to a sheet on which an image is to be formed in accordance with image data. With each of the series of cycles as the printhead is moving, a time slot within the cycle is selected for activating each selected ejector in the set to create a mark on the sheet. Each selected ejector in the set is activated at a unique time slot to approximate a desired configuration of marks, where the desired configuration of marks would have required a plurality of ejectors to be activated within a single time slot.

Figure 1:
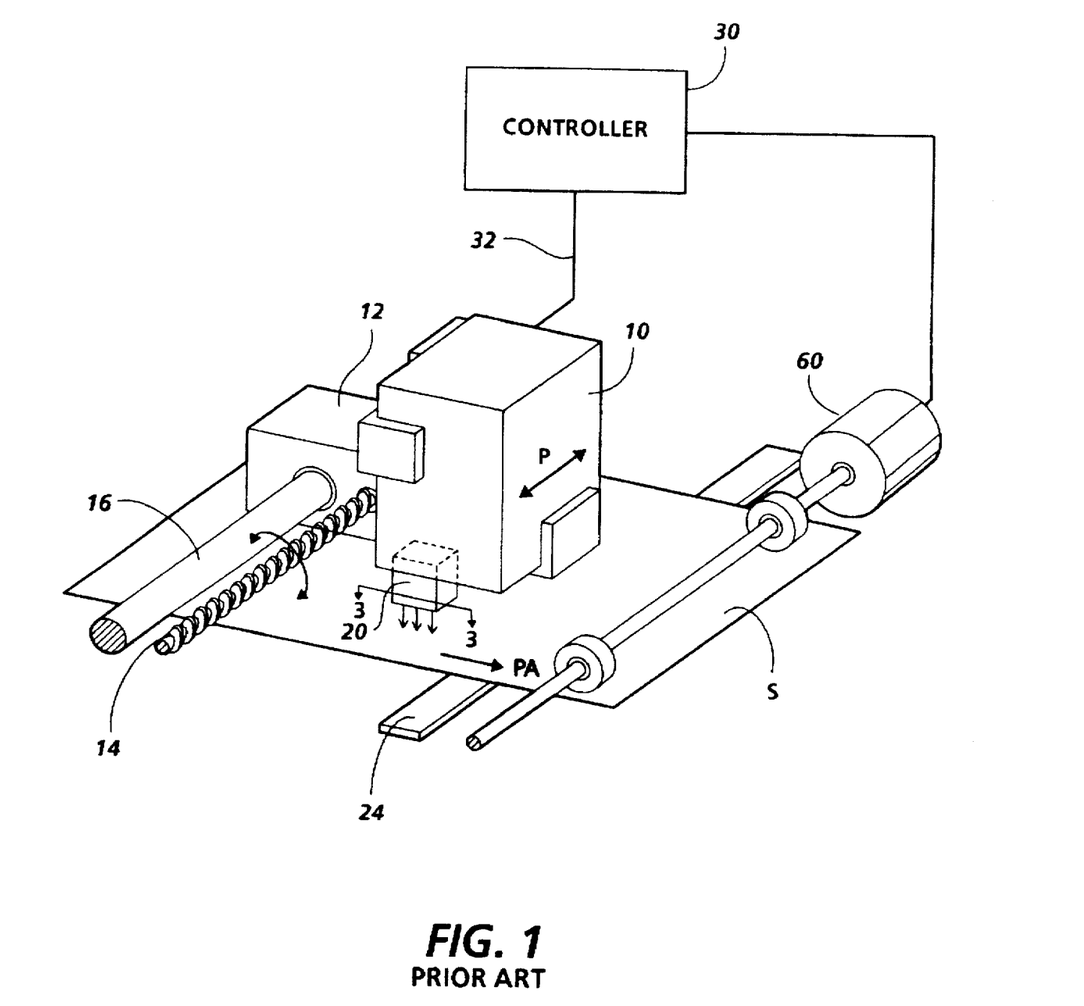
FIG. 1 is a perspective view showing the basic elements of a type of ink-jet printing apparatus.

FIG. 1 shows the rudiments of a reciprocating-carriage-type thermal ink-jet printer for creating color or monochrome images on a sheet S. An ink cartridge 10, having an of ink supply therein, is preferably removably mounted on a carriage 12. This carriage 12 is adapted to move in a back-and-forth manner in a process direction P across sheet S, which is moving in paper advance direction PA. The sheet S is caused to move in direction PA by means of a stepper motor or other indexing motor 60, which is preferably adapted to cause the motion of sheet S in direction PA in a stepwise fashion, holding the sheet S in a stationary position while the cartridge 10 moves across the sheet in direction P, and then indexing the sheet S in paper advance direction P between swaths of printing caused by the action of cartridge 10 on carriage 12.

Carriage 12 is provided with one of various possible means for moving the cartridge 10 back and forth across sheet S. As shown in FIG. 1, there is provided a rotatable lead screw 14 having threads thereon which interact with a structure on the carriage 12 so that, when lead screw 14 is caused to rotate by a motor (not shown), the interaction of the lead screw threads with the structure on carriage 12 will cause the carriage 12 and the cartridge 10 mounted thereon to move in process direction P across the sheet S. Preferably, in most embodiments of an ink-jet printer for use with the present invention, the behavior of the lead screw 14 should allow substantially even back-and-forth motion of the cartridge 10 so that the printing operation can be carried out in both directions. Further mechanical stability is provided for the motion of carriage 12 by, for example, a stabilizing rod 16 which passes through an opening in the carriage 12. Of course, alternate means of providing reciprocating motion of cartridge 10 and printhead 20, such as a belt and pulley system, are known in the art, and can be used in lieu of a lead screw.

At the bottom of cartridge 10, as shown in FIG. 1, is a printhead 20, which is shown directed downward toward the sheet S. Printhead 20 comprises one or more linear arrays of thermal ink-jet ejectors, each ejector being operatively connected to a particular ink supply, in a manner which will be described in detail below, depending on the specific embodiment of the present invention. Generally, the linear array of ejectors in printhead 20 extends in a direction parallel to paper advance direction PA, so that, when the cartridge 10 is caused to move in process direction P, the linear array will "sweep" across the sheet, thus creating a print swath. While the carriage is moving across the sheet S, the various ejectors in the linear array are operated to emit controlled quantities of ink in an imagewise fashion, thus creating the desired image on the sheet. Typical resolutions of the ejectors in printhead 20 may be from 200 to 1200 ejectors per linear inch.

Also provided downstream of the printhead 20 along paper advance direction PA is drying means which are generally shown in FIG. 1 as a heating plate 24. The purpose of the drying means is to provide energy to ink which has just been placed on the sheet S, so that the ink will dry more quickly. Although a heating plate 24 is shown in FIG. 1, the drying means may include any number of devices for conveying heat or other energy to the ink placed on the sheet S, such as a microwave source.

Operatively associated with the printhead 20 is a data input device, or controller, which is generally shown by a schematic box 30 connected by a bus 32 to the printhead 20. The purpose of the controller 30 is to coordinate the activations of the various ejectors in the printhead 20 with the motion of cartridge 10 in process direction P, and with the paper advance direction PA of sheet S, so that a desired image in accordance with the digital data is rendered in ink on the sheet S. Image data in digital form is entered into controller 30, and controller 30 coordinates the position of the printhead 20 relative to a sheet S, to activate the various ejectors as needed, in a manner generally familiar to one skilled in the art of ink-jet printing. Controller 30 is also operatively associated with the various motors such as 60, controlling the position of sheet S through paper advance direction PA, and also the motion of the carriage 12, through means not shown.

The present invention describes a "random access" ink-jet system wherein, including a printhead arrangement wherein addresses of individual ejectors to be activated are submitted to a subset of ejectors on the printhead one at a time, at a predetermined fixed frequency. This arrangement of addressing individual ejectors on a printhead chip at a fixed frequency can be exploited to achieve numerous image-processing advantages. In the following description, the random access printhead system will be described in detail, and then three such practical advantages will be discussed. Among these practical advantages are ejector conflict avoidance; edge smoothing of thick images such as font bitmaps; and halftoning techniques.

Figure 2:
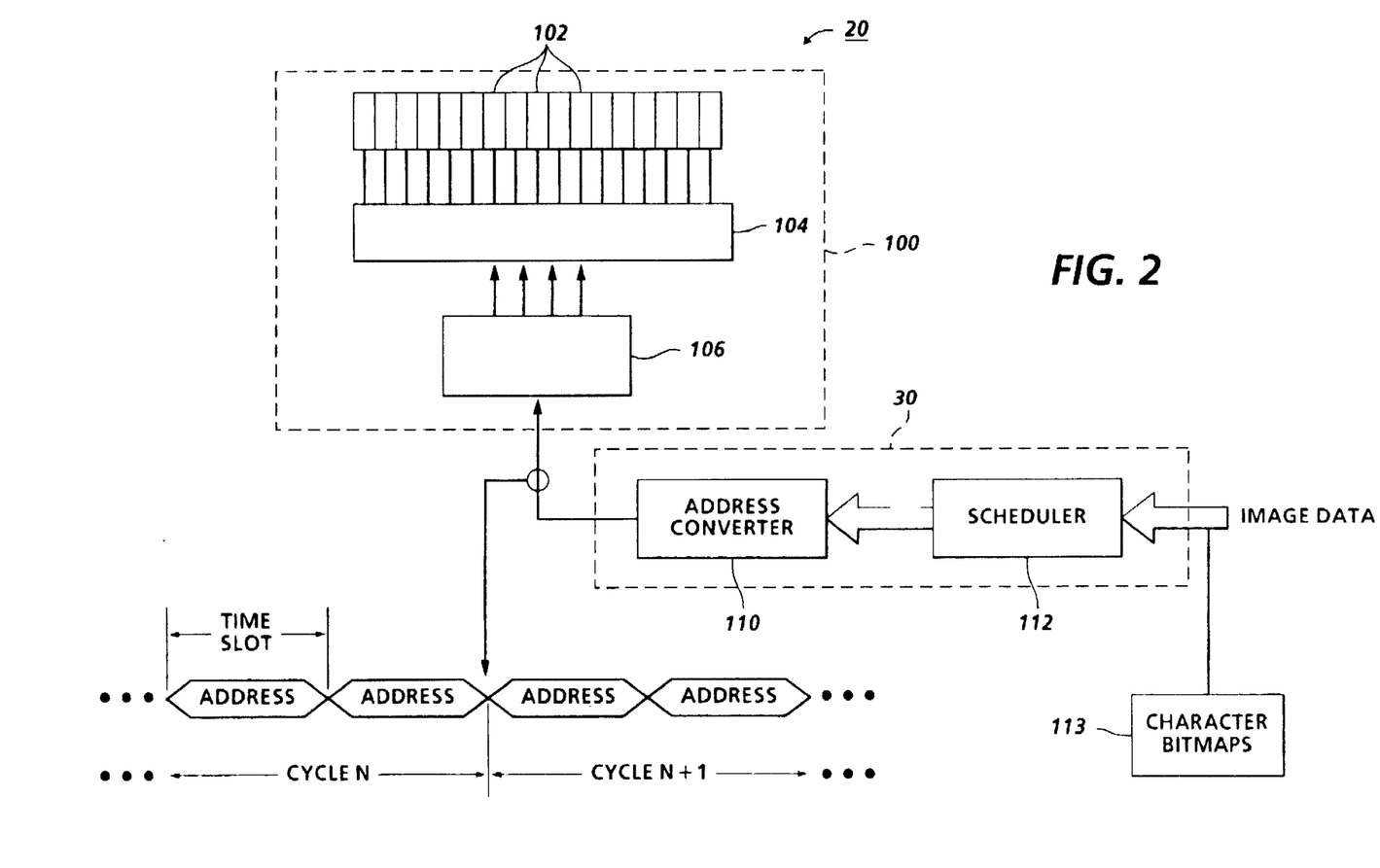
FIG. 2 is a systems diagram showing a portion of a chip having heating elements for ink-jet ejectors thereon, in combination with a scheduling and addressing system of the present invention, along with a representative plan of signal being sent to the printhead, according to one embodiment of the present invention.

FIG. 2 is a plan view of a printhead chip 100 forming at least a portion of a printhead such as 20, according to one aspect of the present invention. As is common in the art of thermal ink-jet printheads, the chip 100 may have formed thereon a linear array of heating elements 102 which create steam bubbles in liquid ink held in capillary channels adjacent thereto (not shown) when a voltage is applied. Thus, by application of a small voltage or other type of signal to a particular heating element 102, the ejector of which the particular heating element is a part will cause a spot of ink to be created on a sheet.

Also formed on the chip 100 of printhead 20 is a "decoder" indicated as 104. The decoder 104 is operatively connected, by individual lines, to each heating element 102 in a particular set of ejectors. As shown, there are fifteen heating elements 102 assigned to one decoder 104. In a preferred embodiment of the present invention, there is provided a plurality of sets of heating elements 102 arranged in a single linear array on the chip, with each contiguous set of heating elements along the linear array being controlled by one particular decoder 104. Decoder 104 activates a particular heating elelment 102 by submitting an activation signal, such as in the form of a voltage, thereto.

Decoder 104 accepts four bit parallel signals from a serial converter 106. There are only four lines connecting serial converter 106 to decoder 104; parallel four-bit addresses are intended to be communicated across the four lines from serial converter 106. As is known in the art, a four-bit binary address corresponds to the decimal numbers 0 to 15. Thus, decoder 104 accepts a series of four-bit addresses from serial converter 106, and, in response to an input address, applies a voltage to the one heating element having that particular address. If there are fifteen heating elements accessible to the decoder 104, each heating element will have a unique four-bit address, and the 0000 address can be used to indicate that, for a particular moment when the 0000 address is submitted, no heating element is to be activated. If there is a constant and predictable time lag between the submission of a four-bit digital address to decoder 104 and the resulting submission of the activation signal to the addressed heating element 102, the frequency of activation of ejectors can be directly related to the frequency at which addresses are submitted to decoder 104.

An important practical constraint in the high-speed operation of certain types of ink-jet printheads is the concept of the "cycle." Particularly in thermal ink-jet printing, there will be an inevitable "recovery time" after each individual activation of an ejector before the ejector is capable of another activation: for example, the capillary channel of the ejector must re-fill with liquid ink from an ink supply. This recovery time therefore represents a maximum frequency at which each individual ejector can be activated, at least without degrading the quality of subsequent spots or unduly heating the printhead.

With reference to the description and claims hereinbelow, a "cycle" is defined as the minimum period between activations of an individual ejector. A "set of ejectors" is defined as a group of ejectors which share an address bus (or are otherwise interdependent) so that, for a given cycle, each ejector may be activated only once.

With further reference to the description and claims hereinbelow, a "time slot" is defined as a sub-cycle within each cycle, in which one ejector in a set of ejectors is capable of being activated. It is another important practical constraint for most known designs of ink-jet printheads that, for each set of ejectors, only one ejector can be activated in any given time slot. Thus, for the example, of the FIG. 2 printhead, where there are fifteen ejectors in the set, the cycle is divided into fifteen time slots, each of the fifteen time slots being a time-window in which one selected ejector in the set can be activated.

Serial converter 106 receives serial data from an address converter 110, which outputs, in this embodiment, a serial bit stream of addresses of ejectors in the set 102 which are desired to be activated at a given time slot within a given cycle. As shown at the bottom of the Figure, there is provided, along the serial bit stream illustrated, individual "packets" of four bits each, here indicated as addresses. Each address corresponds to one time slot, and a series of (in this case) fifteen such time slots correspond to the fifteen ejectors which are capable of being activated within each cycle. With every cycle, there are fifteen time slots which can each be allotted for the activation of one ejector as the printhead moves continuously relative to the sheet. Thus, a selected order of ejectors to be activated within each cycle can be converted into a bit stream from address converter 110 to serial converter 106.

For "empty" time slots within each cycle, in which no ejector is desired to be printed, the address 0000 is applied through serial converter 106 to decoder 104, which will cause no heating element 102 to be activated for that particular time slot. For time slots in which a particular heating element 102 is desired to be activated, the binary number from 0–15 of the particular desired ejector for that time slot is relayed from address converter 110 through serial converter 106 to decoder 104, which applies the necessary voltage to the particular heating element 102.

As can be further seen in the Figure, the address converter 110, which outputs addresses with a regular frequency corresponding to time slots within each cycle, accepts its data from a scheduler 112. Scheduler 112 is illustrated as the location where the above-described methods of allotting ejector activations to time slots within each cycle occurs. Scheduler 112 is typically a software construction including either look-up tables or a dynamic scheduling system to avoid conflicts wherein multiple ejectors are required by the image data to be fired exactly simultaneously, as will be described in detail below. The input to scheduler 112, of course, is data reflective of the desired image to be printed. Address converter 110 and scheduler 112 may be embodied as software routines in a microprocessor forming part of a controller 30 as shown in FIG. 1.

It is desirable that at least a significant portion of the circuit forming decoder 104 be formed in the same surface of a silicon chip such as 100 in which the heating elements 102 are formed. Also, the serial converter 106 may be formed in the silicon chip 100. Such an arrangement will tend to minimize the number of external connections, such as wire bonds, required from the chip 100 of printhead 20 to an outside data source. If the decoder 104 is disposed on the surface of chip 100, only the four parallel lines from serial decoder 106 need be connected on to the chip 100; if the serial decoder 106 is itself disposed on chip 100 as shown, then the only real data line extending from the chip 100 to an outside data source need be the single serial line from address converter 110.

This arrangement in which a relatively small number of outside data lines need interface with the chip forming the main portion of the printhead, should be understood in contrast with many existing designs of ink-jet printheads, in which direct lines to individual heating elements such as 102 on a silicon chip need to be connected to outside data sources. For a full-width-array printhead having several thousand individual ejectors thereon, such an arrangement would prove unwieldy. Even if a decoder such as 104 is readily capable of operating only fifteen individual ejectors, and a plurality of such decoders are provided on a large printhead, the feature of the present invention of being able to accept serial address data through a relatively small number of line greatly simplifies connections between a printhead chip and external data sources.

Further, the fact that a stream of addresses can be fed through a small number of lines creates a great flexibility in precise operations of the printhead. Assuming that there is always a fixed time separation between a submission of an address to serial converter 106 and the operation of an addressed heating element 102, the frequency of ejector activations will be directly related to the frequency of address submissions, generally without any further information having to be submitted to the chip 100. For this reason, manipulation of the frequency of ejection, such as to perform resolution adjustment along the process direction of the printhead, can be performed merely by altering the frequency at which addresses are submitted to decoder 104, or even serial data to serial converter 106. Thus, a resolution-doubling scheme such as that known in the art can be simply implemented with the hardware of the present invention.

Although, in the present discussion, a thermal ink-jet printing system is described, it will be understood that the system of the present invention can be applied to any drop-on-demand ink-jet system, such as piezoelectric or acoustic ink-jet printing.

Figure 3:
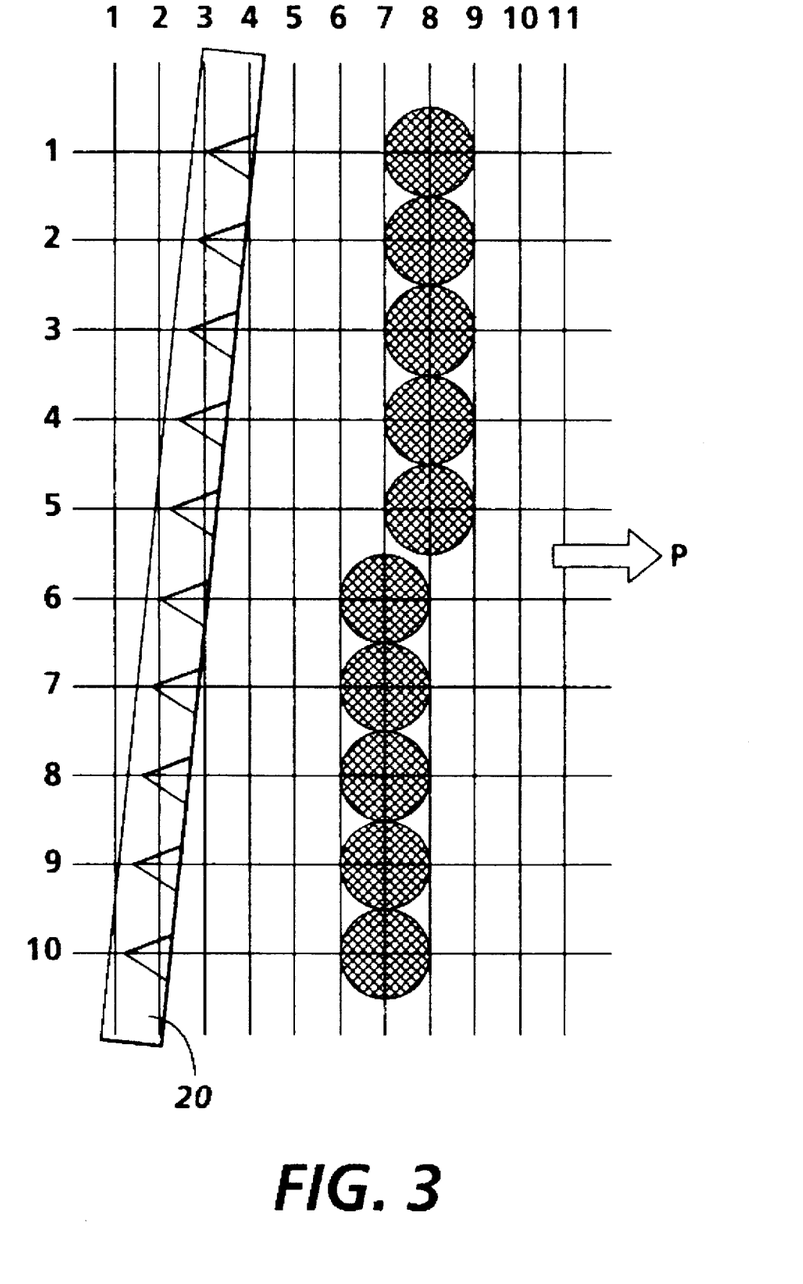
FIG. 3 is a plan view showing a representative portion of a printhead, such as indicated at line 3—3 in FIG. 1, relative to particular precise positions on a sheet on which an image is to be printed, along with a desired configuration of spots placements according to image data.

FIG. 3 is a plan view showing a representative example of the profile of a printhead 20, having ten ejectors thereon, relative to specific areas on a print sheet, represented by grids. The ten-ejector printhead 20 is shown for illustrative purposes only; in a more typical practical embodiment of a printhead, there may be as many as 128 ejectors. Further, all of the ejectors on a printhead may not necessarily be arranged in a single linear array, but can be arranged as a series of staggered or interdigitated linear arrays. As illustrated in FIG. 3, the ejectors are shown as triangles within printhead 20. The printhead 20 is caused to move in process direction P, which is the horizontal direction in FIG. 3.

The vertical lines in the grid of FIG. 3 represent specific locations along process direction P on which spots of ink, indicated as gray circles on the diagram, may be desired to be placed. As illustrated, each vertical line in the grid represents a resolution length along the process direction P. In the Figure, the length between each pair of horizontal lines, which is directly related to the spacing of ejectors in printhead 20, is twice that of the spacing between vertical lines: what this means is that, in this embodiment, the resolution along the direction of motion in the printhead 20 is intended to be twice that of the fixed resolution along the length of the printhead 20. Such an arrangement would be apparent in a printer having a resolution of 300×600 spi, or 360×720 spi.

It will be noted in FIG. 3 that, although the printhead 20 is intended to travel along process direction P, the printhead 20 itself is not aligned to be exactly perpendicular with the process direction P. The angular orientation of ejectors in the printhead 20 relative to the process direction P is such that there are five ejectors (such as ejectors 1–5) for each vertical column on the grid, so that the entire 10-ejector printhead 20 is angled to "cover" two vertical columns on the grid. This skew, or "head tilt," of the printhead 20 relative to process direction P can be taken into account in operating the individual ejectors, as will be explained in detail below.

The desired image shown in FIG. 3 by the gray circles shows a substantially vertical line with a one-grid offset at its middle point, in the position corresponding to the space between ejectors 5 and 6. Such an offset is fairly typical in, for example, ink-jet renderings of lines which are intended to be not exactly parallel to the edge of the page. For these slight angularities, offsets such as that illustrated will, over a long series of very small spots, appear to create a straight line which is slightly angled relative to the edge of the page.

It should be emphasized that the grid shown in the Figure is the maximum resolution specified by the image data itself, not by the physical constraints on the printhead: because the image data is of a certain resolution such as 300×600, the data could not express the position of spot not placed precisely at one of the intersections of the grid, even if the printhead were capable of placing a spot between intersections.

The ten representative ejectors, indicated by their respective horizontal lines in FIG. 3, are intended to represent an "interdependent" set of ejectors as would be found, for example, in currently-practical designs of a thermal ink-jet printhead. To provide a practical system in which individual ejectors can be activated as needed to create a desired image on a sheet by marking at specific pixel locations on the sheet, the individual ejectors (in particular, the energy-imparting portion of each ejector, such as a heating element resistor in a thermal ink-jet ejector) can be addressed only up to a maximum frequency. In the digital control of a large number of ejectors, it is convenient to group ejectors into sets, each ejector in the set sharing at least a portion of an address bus. The effect of a number of ejectors sharing an address bus is that the ejectors cannot be fired absolutely independently of each other in a short space of time.

Because, during the printing process, the printhead 20 is moving at a constant velocity relative to the sheet, the precise time at which an ejector is activated will have a direct result on the precise location of the resulting spot on the sheet. Thus, the exact time slots within each cycle at which particular ejectors are activated may have a conspicuous effect on the appearance of the resulting image. If each cycle is divided into ten distinct time slots, as in the example of FIG. 3, whether a particular ejector in the set is activated toward the first of the ten time slots or toward the last of the ten time slots will of course have a significant effect as to the exact placement of the spot, to such an extent that a desired image such as shown in FIG. 3 may or may not have a distinct "jaggy" or other noticeable defect depending on the order in which individual ejectors in a set are activated within each individual cycle. Further, manipulation of the order of ejector activations in time slots within each cycle, as the printhead moves at constant velocity, can be exploited to "massage" the fine placement of spots to obtain results closer to the desired image.

The particular desired image shown in FIG. 3, the vertical line with a "jog" therein, represents a worst case for printhead control, from the perspective of avoiding the practical limitations that each ejector in a set can be activated only once per cycle, and that no more than one ejector can be fired within any time slot. In order to create the desired image shown in FIG. 3, it is likely that multiple ejectors would have to be fired essentially simultaneously as the printhead 20 moves through process direction P. As the printhead 20 moves through the process direction from left to right, ejector 1 and ejector 6 are so positioned, taking into account the "head tilt" of the array of printhead 20, so that the two ejectors would have to fire exactly simultaneously to obtain the desired image shown. Similarly, other similarly-situated pairs of ejectors in the set, such as 2 and 7, 3 and 8, 4 and 9, and 5 and 10, will also have to fire exactly simultaneously to obtain precisely the desired image shown. As mentioned above, for each of these pairs, the exact simultaneous activation thereof is made impossible by the design of the printhead. Within the illustrated cycle represented by the image shown in FIG. 3, the desired image can be said to represent a set of "conflict time slots," in which, for a given cycle, there are occasions in which it is desired to activate more than one ejector within a given time slot. According to one aspect of the present invention, the activation of individual ejectors in a set is scheduled to avoid having to activate a plurality of ejectors within a single time slot, even when mandated by the image data.

Figure 4:
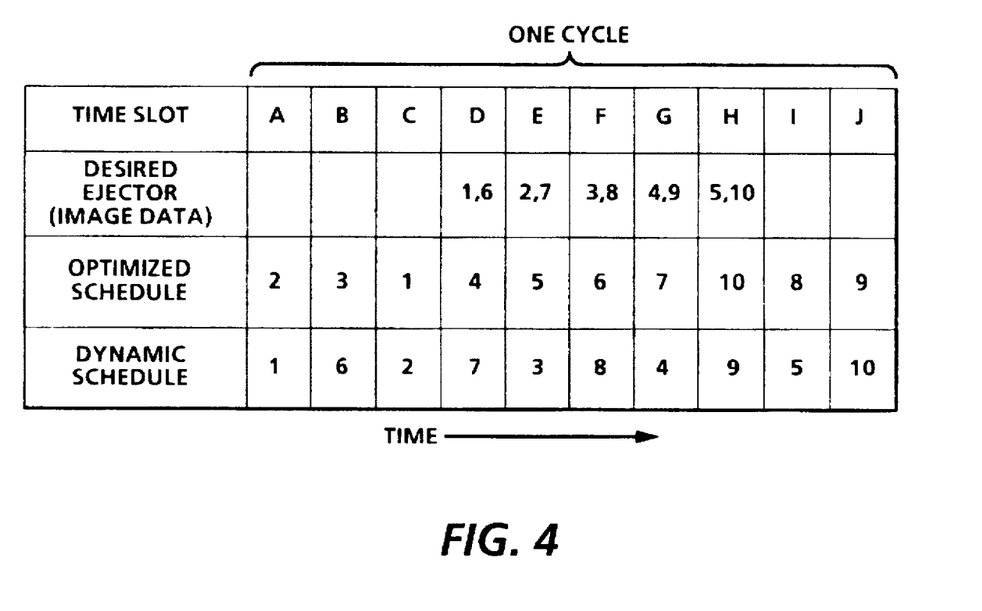
FIG. 4 is a table illustrating the allotment of ejector activations to time slots within a cycle of operation of the printhead of FIG. 3.

FIG. 4 shows a representative one cycle in the operation of the set of ejectors in FIG. 3, showing how the cycle is divided here into ten time slots over time, indicated by letters A–J. As can be seen in FIG. 4, in order to print out the desired image in FIG. 3 exactly as shown, individual pairs of ejectors within the set must be activated exactly simultaneously; or, more precisely, within the same time slot, as shown by the "desired ejector #" row in FIG. 4. As shown for example in FIG. 3, time slot D requires the activation of ejectors 1 and 6; time slot E requires activation of ejectors 2 and 7, and so forth. For the desired image the five time slots represent conflict time slots which must be resolved, so that no more than one ejector is activated within each time slot.

Input data representing a desired image to be printed is polled before it is submitted to the printhead, and data consistent with such conflict time slots as shown in FIG. 4 is detected. Thus, if the desired image of FIG. 3 is submitted to a scheduler such as 112, the scheduler will detect this set of conflicting time slots and then attempt to re-allot the ejector activations to different time slots, so that there will be no more than one ejector activation per time slot.

According to one aspect of the present invention, conflicts of ejector activations within a cycle can be avoided by providing, within the system of allotting ejector activations to time slots within the cycle, by predetermined look-up tables that are called into use to select a non-conflicting order of ejector activations within a cycle to yield a predetermined most visually attractive result. For example, the "optimized" schedule in FIG. 4 shows an artificial allotment of ejector activations to yield the graceful result of FIG. 5. It will be noted that the arrangement of spots in FIG. 5 lacks the conspicuous "jaggy" of the original desired image. However, In a practical manifestation of printing print image, the FIG. 3 arrangement of spots may in fact look better than the "ideal" arrangement of spots desired to be printed, as specified by the image data. The reason for this is that the desired arrangement of spots shown in FIG. 3 is constrained by the fact that the image data itself has a finite resolution. The input data to create a desired image can place spots only at exactly-defined locations on the grid as shown in FIG. 3. However, the physical printing apparatus is in fact capable of placing spots at locations not located exactly at the grid locations specified in the original image data. As noted above, the printhead moves relative to the sheet at a constant velocity, and therefore the printhead sweeps through the grids continuously. The scheduling system of the present invention exploits this fact to be able to place spots at an effective higher resolution than is originally specified in the image data. As can be seen by comparing the layout of spots in FIG. 3 and FIG. 5, while the placement of spots in the desired image is constrained to place spots only at intersection points in the grid, the actual printed image of FIG. 5 can exploit the continuous motion of the printhead relative to the sheet at effectively placed spots with more precision than was apparent in the original image data.

A key advantage of the random-access ejector activation system of the present invention is that the apparent increase in resolution along the process direction, enabled by precise selection of the order of ejector activations for each set of ejectors, creates a degree of freedom of spot placement along the process direction which does not require any variation in the constant velocity of the printhead. Prior-art systems, such as the resolution-doubling technique described above, rely on effectively slowing down the printhead so that the ejectors have more time over every small area on the sheet in order to eject a higher number of spots. Such a resolution-doubling technique, because it requires a relative slowing down of the printhead, severely effects the total throughput time, which directly relates to the output speed of the printer. The system of the present invention, in contrast, substantially increases the resolution of spot placement along the process direction without affecting the required printhead speed.

Such optimized look-up tables for minimizing "jaggies" in specific image situations may be readily incorporated in the bitmaps of typefaces, such as found in page description languages such as PostScript (™). Because bitmaps for individual alphanumeric characters are called into action repeatedly when printing a document, and because the bitmap for each character is itself in the form of a look-up table, selecting the precise order in which individual spots are set on the paper, by expressing the bitmap in the form of ejector addresses in an optimal order, can be incorporated with the the bitmap for each character in each available font. Such an adaptation of character bitmaps for use with the printhead of the present invention is shown in FIG. 2 as character bitmap tables 113. However, it may still be desirable to include a scheduler with character bitmaps, because the characters may be desired to be placed at precise locations relative to the grid as shown in the Figures, and placement of a particular character at a particular location may create an unforeseen conflict.

According to a variation of the basic principle of the present invention, it is conceivable to provide an arrangement whereby, under certain circumstances, the activation of a particular ejector at a particular time can be made in a time slot either subsequent to or preceding the cycle in which the image data specifies the ejector should be activated. That is, if it is so desired, it is conceivable to provide a system whereby the creation of a particular spot could be moved beyond the last available time slot in cycle N and then moved to an early time slot in cycle N+1. A system could be provided in which different cycles overlap by a certain number of time slots, so that, conceivably, an early time slot of one cycle could occur before the end of the previous cycle. Such an arrangement would increase the versatility of spot placement by a particular ejector over time, but at the expense of having to provide a more complicated scheduling system.

In lieu of using a set of predetermined look-up tables for optimal conflict avoidance, a dynamic technique for resolving conflicts as they come up can be performed. An advantage of a dynamic technique of conflict avoidance is that look-up tables must typically be custom-tailored for specific printing situations; a dynamic technique can conceivably process any image data presented to it, to yield an ejector activation order which avoids simultaneous activation of multiple ejectors. In the dynamic conflict-avoidance scheduling technique here described, the image data (list of which ejectors need to be activated at which time slot, according to the placement of spots in the desired image) for the cycle having the conflicting time slots is temporarily retained in a small amount of memory. In this memory, each datum representing a single ejector activation is assigned to one of a set of cells, each cell representing one time slot within the cycle. Preferably, the ejector activations are arranged toward the center of the cycle, as shown.

In order to re-allot ejector activations to different time slots to avoid conflict time slots, the following iterations are used. First, the time slots are iterated in a forward direction (A to J), and, for every time slot having a conflict therein, one ejector activation is moved to a later time slot, but only if there is a non-conflict time slot available following the conflict time slot. If there is no available non-conflict time slot after a conflict time slot, nothing happens. For example, if the initial configuration of ejector activation is, as shown in the "desired ejector #" row of FIG. 4, 1,6/2,7/3,8/4,9/5,10 the method iterates through these time slots from left to right, and, where a non-conflict time slot is available to the right of one of the conflict time slots, one of the ejectors activations is moved to the right. In this case, the only situation in which a conflicting time slot has a non-conflicting time slot to its right is with the (5, 10) time slot; therefore, the 10 in the (5, 10) time slot is moved to the next time slot. So, after the first iteration, the arrangement of ejector activations is 1,6/2,7/3,8/4,9/5/10 with the 10 being moved to the I time slot.

In a subsequent step of the algorithm, the algorithm iterates through the new allotment from right to left (that is, in a backward direction) and reassigns an ejector activation from a conflicting time slot where there is a non-conflicting time slot to the left of the time slot as shown in FIG. 4. Thus, after the second iteration the 1 ejector activation will be moved to the C time slot, to yield:

1/6/2,7/3,8/4,9/5/10.

For subsequent iterations, alternating forward and backward iterations continue to be used; however, where there is a conflicting time slot next to a time slot having only one ejector activation positioned therein next to it, the ejector activation which is alone in a particular time slot is pushed to a next time slot. Therefore, for the third iteration, again a forward iteration as in the first iteration, the result will be

1/6/2,7/3,8/4/9/5/10 with 5 being pushed to the I time slot and the 10 being pushed to the J time slot.

The final result of the series of iterations is to "spread out" the conflict time slots so that all of the available time slots are allotted exactly one ejector activation. It will be noted that the resulting firing order in the real-time conflict avoidance algorithm ("dynamic schedule") row in the table of FIG. 4 is very different from the optimized order shown in the table, and will result in a different-looking arrangement of printed spots. Of course, what is illustrated in FIG. 3 is an extreme worst case scenario in which there are five conflict time slots out often; more likely, there may be only one or two conflicting time slots to produce a desired image, and fewer iterations of the real-time conflict avoidance scheduler algorithm will be necessary in order to remove conflict time slots.

A compromise between the predetermined look-up table method and the real-time conflict avoidance method may be effected by using the real-time method when there are a relatively small number of conflict time slots in a cycle, and then using results from a look-up table when there are three or more conflict time slots in a cycle. Of course, the threshold between when to use an real-time method and when to use a predetermined look-up table will depend on factors such as the number of ejectors in the set, the speed of availability of memory, etc.

Figure 5:
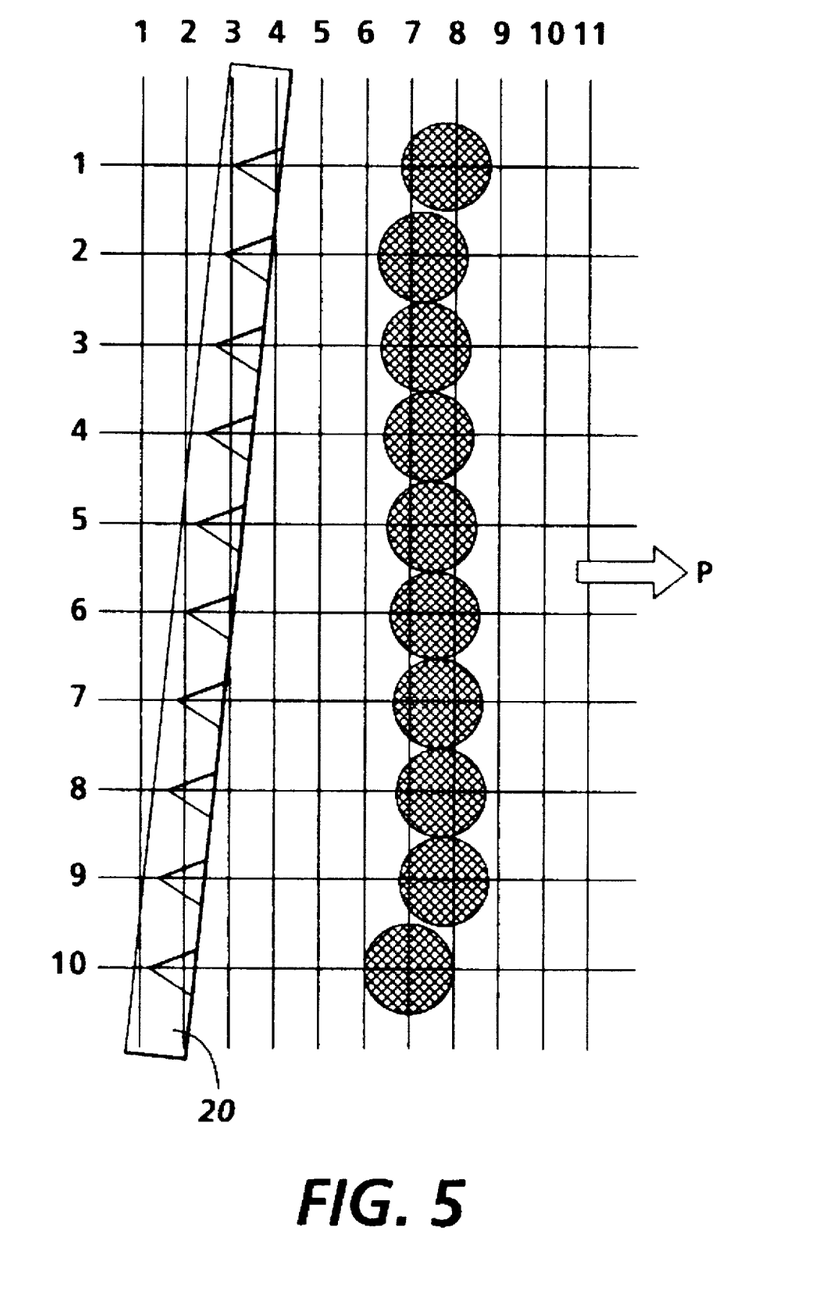
FIG. 5 shows a configuration of spot placement resulting from one type of ejector activation scheduling scheme according to the present invention.

The technique generally illustrated in FIGS. 3–5 of selecting an order of ejector activations which not only avoids conflicts but actually increases the effective resolution of the printhead can be modified in certain ways for edge enhancement of "solid" images, such as font bitmaps as would be found, for example, in page description languages such as PostScript. As is well known in the art of on-demand printing, edge defects such as "jaggies" can be particularly apparent when printing certain character fonts: the delicate curves of serifs which are familiar from offset printing present a common print quality problem in on-demand printing, such as laser printing or ink-jet printing. The subtle curves of certain types of character fonts are hard to render where the individual ink spots left by the printhead must conform to a geometric grid, as shown for example in FIG. 3 above. Just as the line-based "jaggy" in FIG. 3 above can be smoothed out, by proper selection of the order of ejector activation, into the more graceful line of FIG. 5, the pixels forming the edge of a solid image, can be smoothed in a similar manner.

Figure 6:
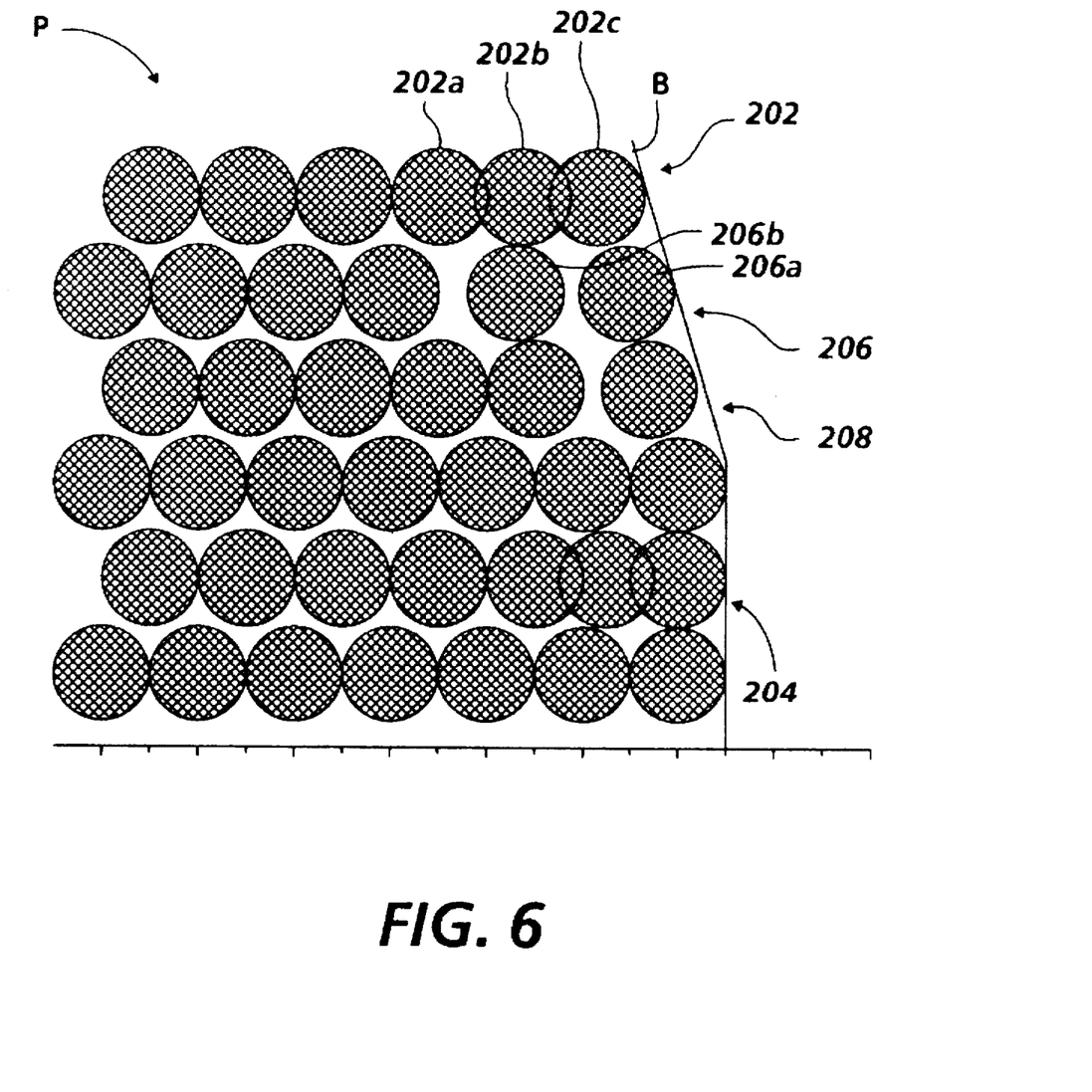
FIG. 6 shows a configuration of spot placement resulting from one type of ejector activation scheduling scheme according to the present invention, for printing an edge of a solid image.
Figure 7:
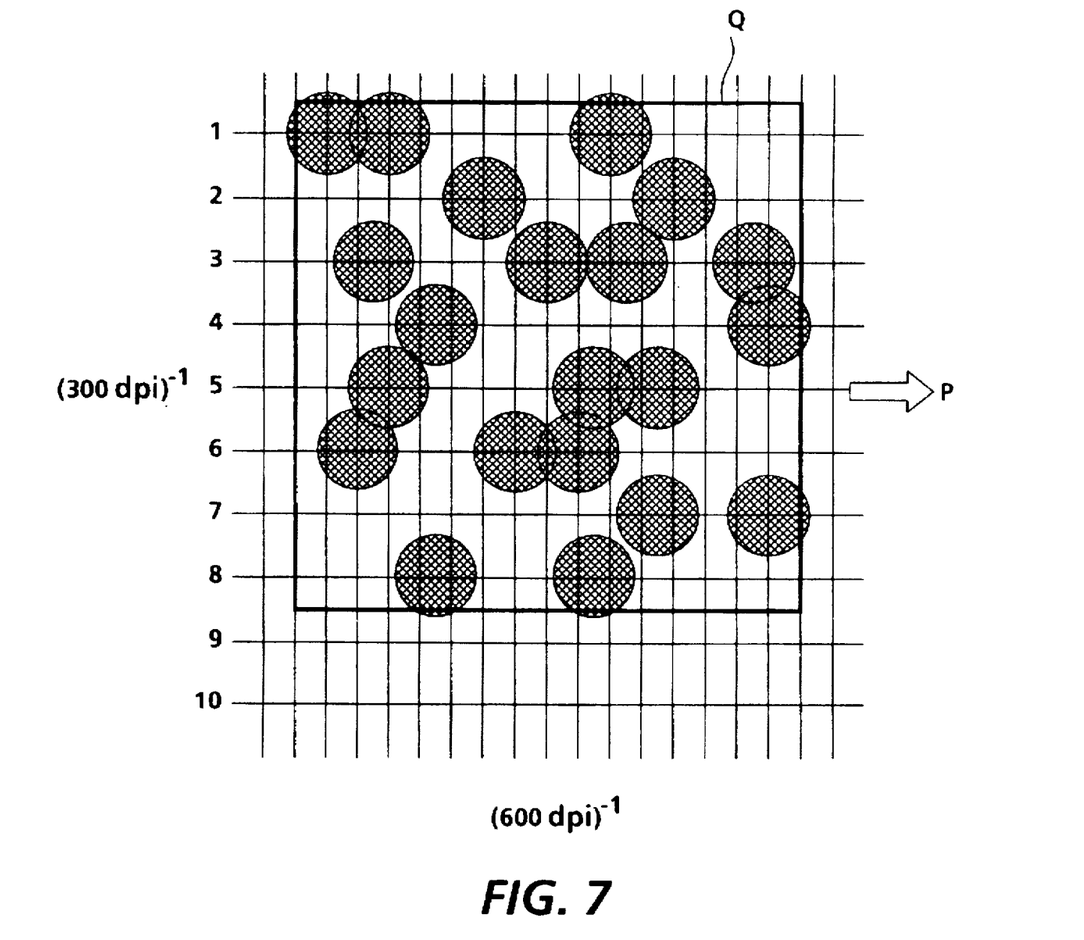
FIG. 7 shows a configuration of spot placement resulting from one type of ejector activation scheduling scheme according to the present invention, for rendering a halftone with random spot distribution in one dimension.

FIG. 6 shows a sample portion of printed spots forming a portion of a solid image, such as an alphanumeric character, which is intended to conform to border B. Border B represents a desired relatively smooth-appearing edge as would be desired, for example, in printing an italic character. Each horizontal line of spots in FIG. 6 represents the behavior of one ejector moving continuously along process direction P. The grid superimposed on the set of spots represents the cycle of ejector activations as they are manifest in the placement of spots on the sheet. It will be noted in FIG. 6 that certain lines of pixels, indicated as 202 and 204, include sets of spots which are unusually "bunched together" along the horizontal line of spots. Alternately, other lines of spots, such as indicated as 206 and 208, show spots which are spaced out more than usual compared to the set of spots forming the black interior of the character. Lines 202 and 204 represent a technique possible with the random-access printhead of the present invention which can be called frequency boosting; lines 206 and 208 represent a technique which can be called frequency suppression.

The random-access ejector activation of the printhead of the present invention is particularly suitable for these ad-hoc variations in spot frequency, such as shown as frequency boosting and frequency suppression in FIG. 6. For example, building on the example of FIGS. 3 and 4 above, in the case of a 10-ejector printhead or portion of a printhead, if the 10 available time slots within each cycle are identified in time order by letters A–J, those ejectors activate near time slot A will, because of the continuous motion of the printhead, be pushed slightly toward the left if the printhead is moving toward the right, while ejector activations in time slots closer to J will be pushed "downstream," that is, toward the right if the printhead is moving toward the right. However, this variation in placement between time slot A and time slot J appears within each individual grid specified by the image data. Image data of a certain resolution will in effect assume that the spot desired to be placed in a particular grid will appear at the visual center (or intersection) of the grid, namely at the equivalent location of time slot E. However, because the random-access ejector activation of the present invention allows each individual spot to be "pushed" either slightly to the right or slightly to the left within each grid, the finer placement of spots such as in FIG. 6 is possible.

In the specific example of FIG. 6, consider a printhead disposed vertically in the view of FIG. 6, such as in the view of FIG. 3, moving in process direction P with one ejector creating the spots for line 202 and another creating the spots for line 206. One example of a technique by which the bunched spots as shown in 202 (here specifically indicated as spots 202a, 202b, and 202c) is to progressively select time slots for each grid which occur earlier within each cycle. For example, in a normal case such as for the bulk of spots forming the interior of the solid image, the spot for a particular line may consistently be activated in time slot E at the center of each grid. To create the desired bunching of spots 202a, 202b, and 202c, for those grids in which the spots appear, the ejector activation can be set to occur at progressively earlier time slots within each grid. For example, while spot 202a may be created at time slot E for its particular cycle, the creation of spot 202b may be made at an earlier time slot in the next cycle, such as at the C time slot; and for further bunching, the activation of the ejector to create 202c may be set at time slot A for that particular grid. By scheduling the spot creation progressively earlier over a number of cycles, the resulting spots can be pushed closer together. The successive pushing of ejector activations to earlier time slots within each grid create, from the perspective of the individual ejector, a frequency boost: wherein the normal case, the ejector is activated every 10 time slots (from E of one cycle to E of the next cycle), with the printing of spots 202a–c, the number of time slots between activations is reduced from 10 to 8 (From E of one cycle to C of the next, and then from C to A of the next cycle).

With regard to the frequency suppression in the printing of spots in line 206, the frequency of activation of the individual ejector creating the spots in line 206 can be increased by spacing out the time slot of activation in each grid to occur later in the cycle. For example, if the bulk of spots in the solid part of the image are created at time slot C within each cycle, spot 206a can be pushed further downstream relative to the spots forming the main part of the solid image by being activated in time slot F of its cycle, and spot 206b can be spread out as well by being activated in time slot I of its cycle. It will be noted that, with each cycle in line 206, the period between activations for spots 206a and 206b is 13 time slots (time slot C of one cycle to time slot F of the next cycle, or time slot F of one cycle to time slot I of the next cycle) as opposed to the usual 10 time slots used for the regular spacing of spots in the rest of the line.

For both cases of frequency boosting in line 202 and frequency suppression in line 206, it can be seen that the mere selection of which time slot to activate a given ejector within each cycle can effectively increase the resolution of spot placement along the process direction. All that is being manipulated is the order within each cycle that the ejectors are activated. This selection of order has the effect of varying the spacing of spots, but this technique has no cost in terms of the overall speed of the printhead relative to the sheet. Thus, there is a substantial increase in effective resolution afforded by the present invention, within effecting the overall speed of the system.

With regard to the frequency boosting in lines 202 and 204, the individual ejector printing each of these lines is selected in a manner that the individual ejector, using the terminology described above, is selected to be activated more than once per cycle. Because the printhead is moving at a constant velocity, the boosted frequency of activating the individual ejector causes the illustrated bunching of spots so that the last spot as shown in FIG. 6 accurately forms the desired border B. Although it was mentioned above that a typical physical constraint of an ink-jet printhead is that a certain amount of time must elapse for an individual ejector to re-fill with ink before being activated again, it has been found that in many embodiments of a thermal ink-jet printhead, re-activating the ejector before complete re-fill, within certain constraints, merely results in subsequent spots being slightly smaller if ejected too soon after the previous activation. It has been found, however, that in the context of forming solid images, the tight placement of adjacent spots will tend to obscure the fact that certain spots may be smaller than others. In such a case, the main physical constraint at activating an individual ejector at higher than normal frequency is that, there will be problems with air ingestion in the ejector channel, and/or the printhead temperature will be undesirable elevated. However, if the frequency boosting for an individual ejector is limited to only the edges of solid images, the total proportion of time at which the ejector is operating at higher than normal frequency can be significantly limited.

Lines 206 and 208 illustrate how, with frequency suppression, certain of the resulting spots are spaced out relative to the normal operating frequency of the ejector. This spacing out of spots enables the end spot in a solid image to more accurately define the border B, but the spacing out of the spots near the edge of the image may have small amounts of white space therebetween. However, it has been found that this type of image anomaly is often not conspicuous in a solid image such as an alphanumeric character, particularly as compared to the effect of a "jaggy" at the edge of the character.

Another technique facilitated by the present invention is also shown in FIG. 6: adjacent rows of spots are offset by one-half pixel in the full black interior areas of the solid image. Such an arrangement of spots can be enabled by the proper ordering of selection of which ejector in a chip set to activate within each time slot, with reference to FIG. 2 above. An advantage of this scheme for printing the interiors of solid images is that it has been found that smaller drop sizes can be used to obtain an acceptable full black.

The basic method by which to obtain the effect of adjacent rows of spots being offset by one-half pixel within the interior areas of the solid image is simply to assign time slots to ejectors whereby odd-numbered ejectors in the printhead are scheduled to be activated in the first half of each cycle and the even-numbered ejectors are scheduled to be activated in the second half of the cycle. For example, using the 10-time-slot printhead example, if one ejector in the printhead is scheduled to be activated in time slot A, its immediate neighbor should be scheduled to be activated at time slot E, thereby being spaced from the spot made by the first ejector by 5 time slots in a 10 time slot cycle. A third ejector scheduled to be activated at time slot B should be disposed next to a fourth ejector scheduled to be activated at time slot F, and so forth, so that each ejector in the printhead has as its immediate neighbors ejectors which are scheduled to be activated at close to half the number of time slots in the cycle. In this way, as illustrated in FIG. 6, rows of spots made by adjacent ejectors are offset by one-half cycle as the printhead moves continuously relative to the sheet.

The random-access principle of the present invention can also be used to facilitate advanced techniques of forming desired halftone images. U.S. Pat. No. 5,233,399, assigned to the assignee of the present invention, discloses one such technique for simulating the halftone response of a chemical-photographic image in an ink-jet print, by introducing a random distribution of spot placement along the direction of motion of the printhead. As described in that patent it has been found that a probability-based selection of spot placement, as opposed to a regular pattern of spots according to a certain halftone screen, simulates the logarithmic response of an apparent halftones which add a degree of realism to chemical-photographic-based images. This pseudo-random distribution of spots can be created by, in effect, using a random number generator as a source of randomness when deciding whether to print a spot in a particular location in the image. For example, if a certain small area of an image requires a 30% halftone, instead of merely regularly distributing the placement of spots so that three spots are regularly placed in every ten available spaces, the technique of the referenced patent in effect performs a "lottery" in which for each available space, a random number from 1 to 10 is generated, and a spot is placed only (in this example) if the random number is 3 or under. For a 50% halftone, a spot would be placed if the random number was 5 or under.

Because the printhead of the present invention enables a higher resolution of spot placement along the process direction, the selection of which particular time slot a particular spot is placed within each cycle can be exploited as a further source of the desired randomness of spot placement which, according to the referenced patent, enhances the "realism" of halftone images. For example, there could be provided, within the scheduler illustrated in FIG. 1, a source of random numbers that can be called into action when halftone images are being created. This random number generator can be used to assign random time slots (such as A to J) for each spot desired to be printed in the halftone image. The effect of random allotments of time slots is that the spots produced thereby will be distributed on the sheet with a further dimension of the desirable randomness. In contrast, for a system in which spots must be placed within a grid specified by the image data, the manifestation of randomness must be done on a pixel-by-pixel basis. A difficulty with trying to create randomness when one must allot spots randomly to pixel spaces is that a relatively large number of pixel spaces must be required to establish an appearance of randomness. The present invention can establish a random-looking distribution of spots over a wide range of gray scales. Even if digital data is in effect presented to the printhead in the form of a uniform halftone screen, the effect of randomizing the assignment of time slots to individual dots in the regular halftone screen can readily be used to add the desirable dimension of randomness to spot placement.

Figure 8:
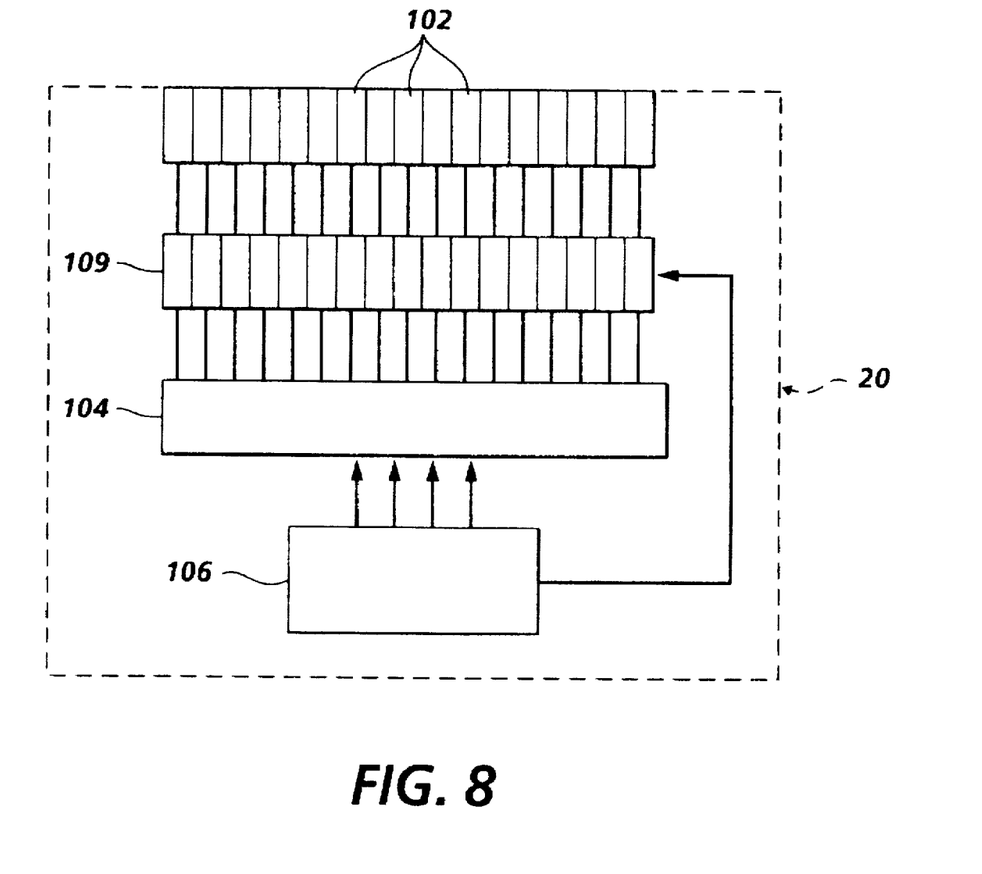
FIG. 8 shows a variation of the printhead of the present invention.

FIG. 8 shows a variation of the printhead of the present invention, in which a latch is interposed between decoder 104 and the heating element 102 for the individual ejectors in the printhead 20. It may be desirable, for certain applications, to provide a printhead in which multiple ejectors can be fired exactly simultaneously. In this instance, instead of decoder 104 directly activating heating elements 102 in real time as the addresses are received from address converter 106, the signals directly relating to addressed outputs of decoder 104 are retained temporarily in individual cells in latch 109. Latch 109 retains the activation signals used to activate the addressed ejectors 102 within a particular cycle. Only after all of the addresses of ejectors to be activated in a cycle are fed serially through address converter 106 and expressed through decoder 104 is a signal passed from address converter 106 or other source to cause the stored signals in latch 109 to be output simultaneously to the desired addressed heating elements 102. In this way, latch 109 holds the activation signals of the particular heating elements to be activated until all of the addresses are loaded onto the chip, and then activates all of the addressed ejectors simultaneously.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

We claim:

1. An ink-jet printing apparatus; comprising:
   a printhead, defining therein a plurality of ejectors; each ejector including an energy-imparting portion being selectably actuable by application of a signal thereto;
   a decoder, operatively connected to an energy-imparting portion of each of the plurality of ejectors, the decoder accepting as inputs a list of digital addresses of individual ejectors to be activated, the decoder activating the energy-imparting portion of an ejector in response to receiving a digital address of the ejector;
   means for selectably activating each of a set of ejectors within a cycle of predetermined duration, the cycle being divided into N time slots for a set of N ejectors in the printhead;
   means for moving the printhead in a process direction at a process velocity relative to a sheet on which an image is formed in accordance with image data; and
   a scheduler for selecting a time slot within the cycle for activating each selected ones of said ejectors in the set to create a mark on the sheet with each of a series of cycles as the printhead is moving, whereby each selected ones of said ejectors in the set is activated at a unique time slot to approximate a desired image configuration of marks.

2. The apparatus of claim 1, wherein the the energy-imparting portions of the ejectors and at least a portion of the decoder are formed on a single silicon chip.

3. The apparatus of claim 1, further comprising an address converter operatively connected to the decoder, outputting to the decoder a series of digital addresses of ejectors to be activated over time.

4. The apparatus of claim 3, the address converter outputting addresses to the decoder at a regular frequency relating to a desired frequency of ejector activation of the printhead.

5. The apparatus of claim 1, the address converter outputting to the decoder, as part of the series of digital addresses, a signal consistent with no ejector being activated at a particular time.

6. The apparatus of claim 6, the scheduler further including
   means for detecting in the image data cycles having combinations of pixel areas to be marked which require a plurality of ejectors to be activated within a single time slot; and
   means for iterating through each time slot for the image data in the detected cycle in a forward order, and for conflict time slots having a plurality of ejectors to be activated with no ejector to be activated in a subsequent time slot, rescheduling one of the ejectors in the conflict time slot to the subsequent time slot in the cycle.

7. The apparatus of claim 6, the scheduler further including
   means for iterating through each time slot in a backward order, and for conflict time slots having a plurality of ejectors to be activated with no ejector to be activated in a previous time slot, rescheduling one of the ejectors in the conflict time slot to the previous time slot in the cycle.

8. The apparatus of claim 1, the scheduler further including means for assigning time slots within a cycle to the ejectors to be activated according to a predetermined look-up table.

9. The apparatus of claim 8, wherein the look-up table includes data for forming predetermined character bitmaps.

10. The apparatus of claim 1, the scheduler further including means for randomly assigning time slots within a cycle to the ejectors to be activated.

11. The apparatus of claim 1, the scheduler further including means for scheduling an activation of an ejector within a cycle specified by the image data to a time slot within a cycle other than the specified cycle.

12. The apparatus of claim 1, further comprising a latch operatively interposed between the decoder and the printhead, the latch adapted to retain activation signals for ejectors to be activated within a cycle, and then to activate the addressed ejectors of the printhead simultaneously.

13. A method of operating a printhead including a linear array of ejectors, comprising the steps of:

providing, for a set of N ejectors in the printhead, means for selectably activating each of the ejectors in the set within a cycle of predetermined duration, the cycle being divided into N time slots;

moving the printhead in a process direction at a process velocity relative to a sheet; and with each cycle as the printhead is moving, selecting a time slot within the cycle for activating each selected ejector in the set to create a mark on the sheet, whereby each selected ejector in the set is activated at a unique time slot to approximate a desired image configuration of marks, where the desired configuration of marks would have required a plurality of ejectors to be activated within a single time slot.

14. The method of claim 13, the selecting step including the steps of detecting in the image data combinations of pixel areas to be marked which require a plurality of ejectors to be activated within a single time slot;

retaining image data for an entire cycle where a plurality of ejectors are required to be activated within a single time slot;

for the image data in the retained cycle, iterating through each time slot in a forward order, and for conflict time slots having a plurality of ejectors to be activated with no ejector to be activated in the next time slot, rescheduling one of the ejectors in the conflict time slot to a subsequent time slot in the cycle.

15. The method of claim 13, further comprising the step of for the image data in the retained cycle, iterating through each time slot in a backward order, and for conflict time slots having a plurality of ejectors to be activated with no ejector to be activated in the next time slot, rescheduling one of the ejectors in the conflict time slot to the previous time slot in the cycle.

16. The method of claim 14, further comprising the step of for cycles in which the number of time slots where a plurality of ejectors are required to be activated exceeds a predetermined amount, assigning time slots to the ejectors to be activated according to a predetermined look-up table.

17. The method of claim 13, the selecting step including the steps of polling image data for activating the ejectors to mark pixel areas on a sheet to yield a desired image;

detecting in the image data combinations of pixel areas to be marked which require a plurality of ejectors to be activated within a single time slot;

for cycles in which a plurality of ejectors are required to be activated within a single time slot, assigning time slots to the ejectors to be activated according to a predetermined look-up table.

18. The method of claim 13, the printhead being oriented at a predetermined head tilt angle relative to the process direction.

* * * * *